May 30, 1933.　　P. C. ACKERMAN　　1,911,336
PROCESS OF MAKING BEARING MEMBERS AND THE LIKE
Filed Oct. 24, 1930

INVENTOR:
Paul C. Ackerman,
by Carr Kerr & Gravely.
HIS ATTORNEYS.

Patented May 30, 1933

1,911,336

UNITED STATES PATENT OFFICE

PAUL C. ACKERMAN, OF CANTON, OHIO, ASSIGNOR TO THE TIMKEN ROLLER BEARING COMPANY, OF CANTON, OHIO, A CORPORATION OF OHIO

PROCESS OF MAKING BEARING MEMBERS AND THE LIKE

Application filed October 24, 1930. Serial No. 490,857.

My invention relates to the process of making such articles as raceway members of antifriction bearings, in which the article as a whole must be case hardened but in which it is desirable to have a projecting unhardened flange adapted to secure some member to the race member, and it also relates to the finished articles. The invention has for its principal object to facilitate the securing of a ring at the end of such an article as a race member of an antifriction bearing and to eliminate the necessity for the separate fastening devices heretofore required. The invention consists principally in the process hereinafter described and claimed, such process including the steps of making the bearing member with a projecting end portion which is largely ground away after carburizing to leave a relatively soft projecting annular rib, which rib, by reason of its not being carburized remains soft during the subsequent heat treatment and quenching of the race member.

In the accompanying drawing.

Figure 1:
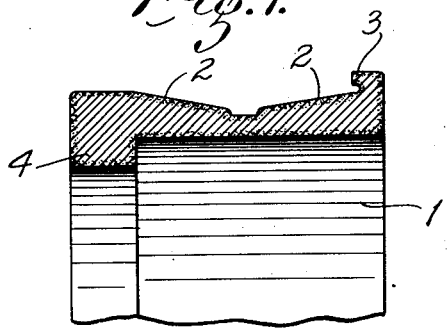
Fig. 1 is a partial sectional view of the inner bearing member of a taper roller bearing made according to my invention, showing the bearing member after the first step of the process constituting the present invention, in which the bearing member is provided with an enlargement at one end; the stippling indicating the second step of the process in which the bearing member is carburized.
Figure 2:
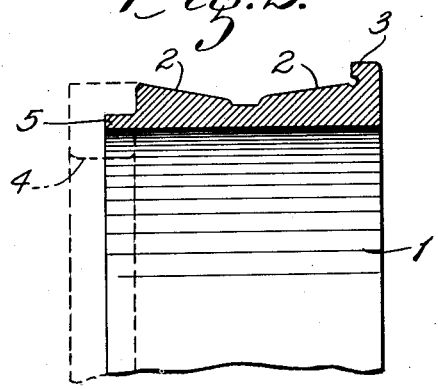
Fig. 2 is a view of the third step, in which this enlargement is largely ground away to leave a projecting annular rib.

The drawing illustrates a cone 1 or inner bearing member of a conical roller bearing, the cone illustrated having two race portions 2 for two sets of conical rollers. At the end of one of said raceways 2, the cone is provided with an integral thrust rib 3 for one series of rollers. At the other end, the cone is provided with a longitudinal (endwise) and radial (inward) extension or enlargement 4.

The cone thus formed is carburized in any desired manner. After the carburizing step, the entire outer or surface portion of the cone contains carbon (indicated by the stippling in Fig. 1) to a depth depending upon the extent of the carburizing operation. The carburizing is not followed by the usual heat treatment and quenching operation, so that the surface of the cone remains soft, notwithstanding its carbon content. The greater portion of the enlargement 4 is then removed by a grinding, cutting or other suitable operation, to leave a projecting annular rib 5 whose inner bore is the same as the bore of the cone.

After the removal of the excess portion of the enlargement 4, the cone 1 is heat treated and quenched, thereby hardening all of the original surface of the cone containing carbon. The rib 5 does not become hard, because it was so far from the surface of the original enlargement 4 that the carbon did not penetrate thereto.

Figure 3:
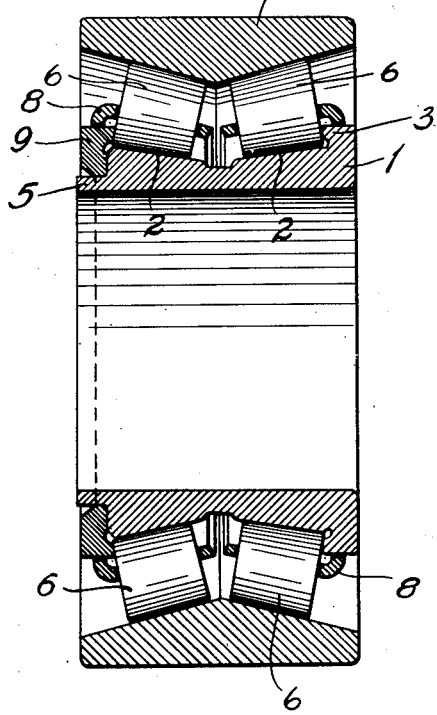
Fig. 3 is a sectional view of an assembled bearing showing a thrust ring mounted on said projecting rib.
Figure 4:
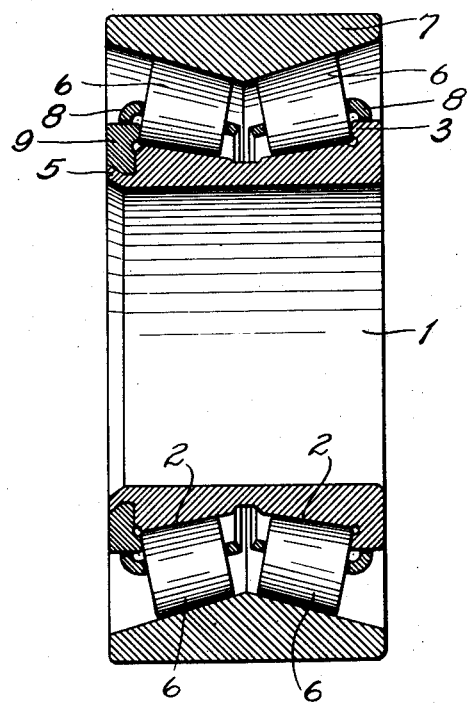
Fig. 4 is a sectional view showing said rib bent over the edge of said thrust ring to secure it in place.

The bearing is then assembled as shown in Fig. 3 by placing rollers 6 and an outer bearing member 7 in position, along with cages 8 for the rollers. A thrust ring 9 for one series of rollers is then mounted on said annular rib 5 and said rib is spun or otherwise bent over the edge of the thrust ring 9 to form the completely assembled bearing shown in Fig. 4.

Separate thrust ring members have been heretofore used, but they required sleeves and other fastening means separate from the bearing member and they were difficult and expensive to make. The present construction uses the metal of the bearing member itself to form a securing rib. At the same time it does not sacrifice the hardness required of the bearing surface.

What I claim is:

1. The process of making bearing members which comprises initially making the bearing member with an enlargement at one end, carburizing the bearing member, grinding away most of said enlargement to leave a projecting annular rib, mounting a ring on said rib at the end of said bearing member and securing said ring in position by means of said rib.

2. The process of making bearing members which comprises initially making the bearing member with a longitudinal and radial enlargement at one end, carburizing the bearing member, grinding away most of said enlargement to leave a projecting annular rib whose bore is a continuation of that of said bearing member, mounting a ring on said rib at the end of said bearing member and securing said ring in position by means of said rib.

Signed at Canton, Ohio, this 21st day of October 1930.

PAUL C. ACKERMAN.